Patented Aug. 26, 1952

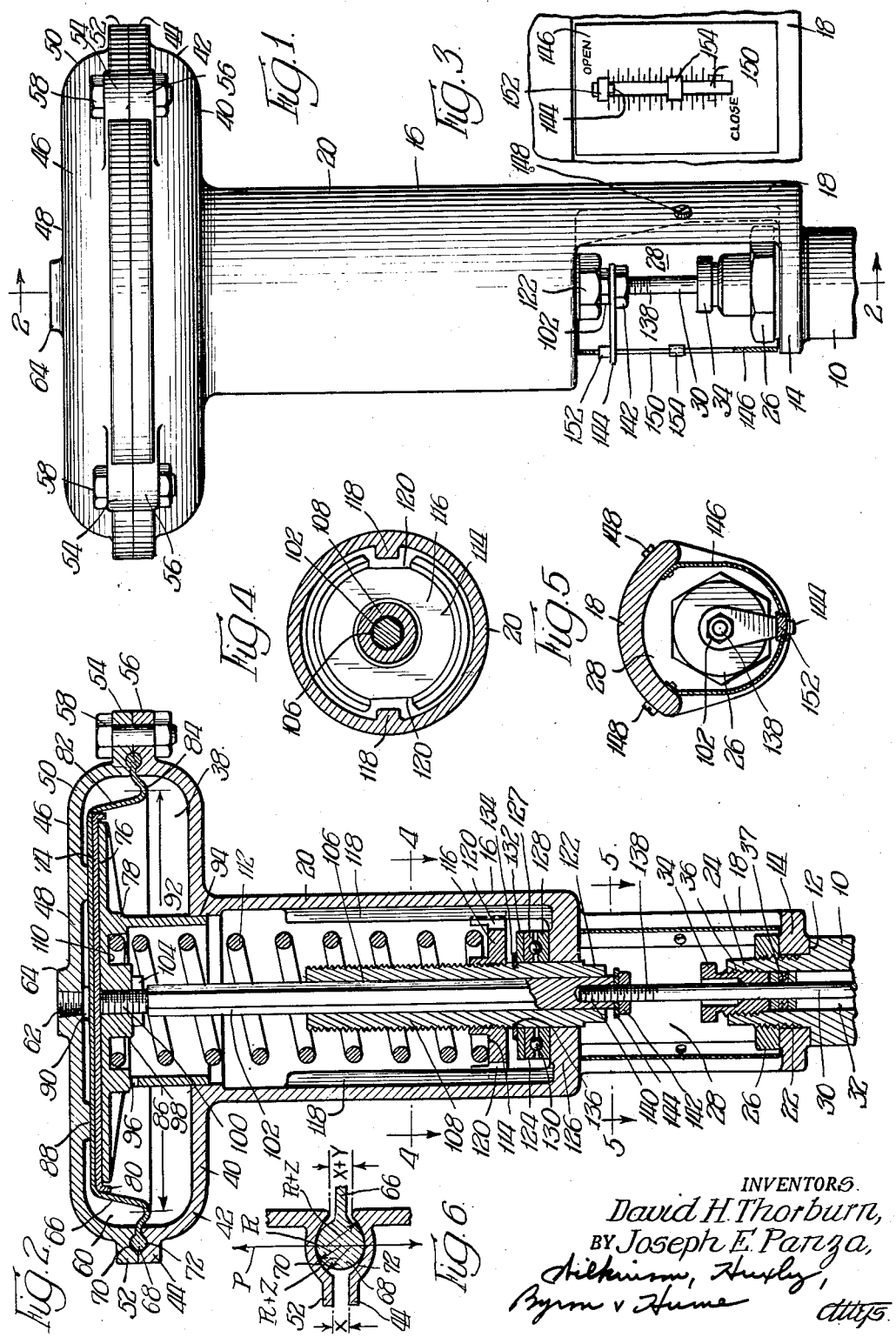

2,608,211

UNITED STATES PATENT OFFICE 2,608,211

VALVE MOTOR

David H. Thorburn, Oak Park, and Joseph E. Panza, Chicago, Ill., assignors to The Powers Regulator Company, Chicago, Ill., a corporation of Illinois Application June 8, 1949, Serial No. 97,828

15 Claims. (Cl. 137—556)

This invention pertains to a diaphragm motor of the fluid actuated type for controlling a valve, damper or other mechanism.

It is an object of this invention to provide a diaphragm motor of relatively simple and inexpensive construction, which is light in weight, and dependable in operation.

Another object of the invention is to provide a diaphragm motor which is interchangeable with other motors, and which can be quickly placed or replaced in operative relation to mechanism to be controlled thereby.

Another object of the invention is to provide a diaphragm motor so constructed and arranged that it is only necessary to move relatively few securing members in order to effect replacement of the diaphragm.

Another object of the invention is to provide a flexible diaphragm adapted particularly for use in a motor, the diaphragm and the associated parts of the motor, being so constructed and arranged that the diaphragm particularly is operative after removals from and replacements in a motor.

Another object of the invention is to provide a diaphragm motor of relatively long stroke and small diameter wherein the effective area of the diaphragm of the motor is substantially constant throughout the entire travel of the motor.

Another object of the invention is to provide a diaphragm motor in which the moving parts are substantially sealed from dirt, or other deposits.

Another object of the invention is to provide a diaphragm motor which is provided with a self-positioning and wide view position indicator.

Another object of the invention is to provide a diaphragm motor wherein means is provided for preventing any inequalities of operation or workmanship in the diaphragm from causing any improper operation between relatively moving parts of the motor which would affect the desired operation of the motor throughout its cycle of operation.

Another object of the invention is to provide a diaphragm motor which is so constructed and arranged that wear of the parts is reduced to a minimum, and wherein the parts are designed so that destructive strains are not imposed on the parts of the motor.

Another object of the invention is to provide a diaphragm motor wherein there is provided convenient, rapid and positive means of adjustment which can be operated at any desired time, such as after installation and use.

With these and various other objects in view, the invention consists of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a side elevation of a diaphragm motor embodying the invention, which motor is adapted to be used for controlling a valve, damper or other mechanism, a part of said motor, to wit, the position indicator, being shown in section;

Figure 2 is a sectional elevation of the damper motor illustrated in Figure 1, the same being taken substantially in the plane as indicated by the line 2—2 of Figure 1;

Figure 3 is a fragmentary elevation looking toward the right as illustrated in Figure 1, showing the wide view indicator for said motor;

Figure 4 is a sectional plan view taken substantially in the plane as indicated by the line 4—4 of Figure 2;

Figure 5 is a sectional plan view taken substantially in the plane as indicated by the line 5—5 of Figure 2; and Figure 6 is an enlarged, fragmentary sectional elevation through the diaphragm bead and adjacent parts of the motor housing, the parts being shown before securing the parts in position.

The diaphragm motor illustrated, is of the fluid actuated type and is adapted to control a valve, damper or other mechanism, and for the purposes of illustration the mechanism to be controlled by the motor is shown as provided with the fitting or cap 10, shouldered at 12 for supporting the mounting bracket 14 of the lower housing 16 of the motor. Lower housing 16 is provided with the arcuate or open bracket 18 interposed between the mounting bracket 14 and the substantially cylindrical body portion 20 of the lower housing.

Mounting bracket 14 is supported on shoulder 12 and is apertured as at 22 for embracing the upwardly extending threaded end 24 of the fitting 10, a suitable fastening nut 26 being adapted to be removably threaded on end 24 for securing the motor to the fitting 10. The arcuate bracket 18, in effect, provides an open throat portion 28 affording access to nut 26 whereby a wrench may be swung through a wide angle for facilitating mounting and dismounting through movement of nut 26.

The mechanism operated by the motor is shown as provided with the stem 30 extending through passage 32 in fitting 10 and through packing nut 34, the nut being adapted to be threadedly secured as at 36 to fitting 10 retaining packing 37 through which stem 30 also extends. The cylindrical body portion 20 is provided at its upper end with an enlarged substantially circular (in plan), lower diaphragm chamber 38, formed by radial wall 40 which at its outer end is flanged or extends upwardly as at 42, and is provided with the outwardly extending peripheral holding flange 44.

Upper housing member 46, which is in the form of a cap, is provided with the radial wall 48 curved or flanged as at 50, and is provided with the outwardly extending peripheral holding flange 52 adapted to mate with and be supported on flange 44, (both flanges being preferably of the same size and shape). Flanges 52 and 44 are provided with a plurality of securing lugs 54 and 56 adapted to be aligned for the reception of securing means, such as the nut and bolt assemblies 58, such an assembly serving to secure together adjacent lugs 54—56.

Upper housing member 46 is, therefore, so shaped as to provide the upper diaphragm chamber 60 adapted to be supplied by operating fluid from a source of operating fluid pressure (not shown), being connected thereto through threaded opening 62 extending through the centrally disposed boss 64 of member 46.

A flexible diaphragm 66 comprises an intermediate membrane which is provided at its periphery with a diaphragm ring or bead 68 which ring may be either circular, oval or oblate in section. The diaphragm is of suitable material, such as synthetic rubber or the like, which is impervious to moisture, separates chambers 38 and 60 and may be provided with a fabric insert, if desired. Ring 68 is retained between the flanges 52 and 44, being received in the facing annular grooves or channels 70 and 72 provided in flanges 52 and 44, respectively, and the diaphragm is so designed and so secured by said flanges that it is self-sealing under increasing fluid pressures.

In forming annular grooves 70 and 72, as shown particularly in Figure 6, each of said grooves is the segment of a circle, the radius of each segment being equal, and represented by $R+Z$, the centers being in a vertical plane P. The section of bead 68 is also circular, the radius of its circle being in the vertical plane of the centers of the radii of grooves 70 and 72, but the radius of bead 68 is less than either of the radii of grooves 70 or 72, being represented by R in Figure 6.

As shown in Figure 6 flanges 52 and 44 at their outer periphery are spaced apart, inasmuch as Figure 6 shows the parts before they are secured together as by nut and bolt assemblies 58. In unsecured position the outer periphery of the flanges 44 and 52, when the grooves are in contact with the bead 68, are spaced apart a distance represented by X. The flanges 52 and 44 inwardly of grooves 70 and 72 are rounded to present smooth surfaces adjacent the diaphragm 66, and when the parts are in unsecured condition, the rounded edges of grooves 70 and 72 are spaced apart a distance slightly greater than the spacing X, as represented by $X+Y$ in Figure 6. When the parts are secured together the outer peripheries of flanges 52 and 44 are in contact with each other, so that X becomes zero, but there is sufficient spacing between the rounded inner edges of the grooves 70 and 72 to accommodate the thickness of the diaphragm 66 without compressing said diaphragm so while X becomes zero, Y is still slightly greater than the thickness of the diaphragm 66. Thus flanges 52 and 44 inwardly of the respective channels 70 and 72 are spaced apart to form an annular passageway so that there is no compression on the membrane portion of the diaphragm adjacent the ring, but the bead 68 is compressed in the direction of the vertical plane P through the radius R of the bead, and radii $R+Z$ of the channels 70 and 72, the sizes of said channels permitting lateral displacement of the material of the bead. Very low pressures are sealed by the initial squeeze on the ring 68 through flanges 52 and 44 being held by the securing means 58, and as the pressure is increased the diaphragm ring is drawn inwardly toward the narrower part of the grooves, increasing the squeeze on the diaphragm ring and thus providing a tighter seal.

The membrane part of the diaphragm 66 is supported on, but not secured to the thrust plate 74 which, in turn, is supported on but not secured to the top plate 76 of the guide or piston member 78, the lateral movement of the thrust plate being limited by the spacing of its downwardly extending peripheral flange 80 from the periphery of the plate 76.

The membrane of the diaphragm thus is supported on the upper surface of the thrust plate 74 and extends downwardly and outwardly therefrom when the motor is in inoperative position, as illustrated in Figure 2, providing a depending web 82 which extends to the ring 68 through the deep fold 84. Providing the deep fold adjacent the ring 68 enables the flat area of the membrane (that is, that portion supported by the thrust plate 74) to travel an appreciable distance without stretching the material, and this fold serves to maintain a constant effective area of the diaphragm throughout its travel. This effective area is represented by an area greater than the area of the thrust plate 74 but slightly smaller than the area of the circle, having a diameter 86. The diameter 86 is determined by the distance between the centers of circles conforming to the arc corresponding to that of the fold 84. Such construction provides a definite travel for a definite increase in fluid pressure at all positions of travel of the diaphragm and particularly makes possible equal changes of travel for equal changes in pressure.

Annular ring 88 is provided within diaphragm chamber 60 for supporting the diaphragm 66 in the absence of fluid pressure, said ring 88 being provided with one or more suitable passageways 90 permitting the distribution of fluid pressure supplied through opening 62 over the surface of the diaphragm before there is any travel. Force from the diaphragm is imparted to the thrust plate 74 which, as before described, is free to slide a limited distance determined by flange 80 and plate 76 which allows the diaphragm 66 to slide freely with no restraining influence laterally. Any sidewise thrust of the diaphragm is dissipated in free movement, thus eliminating any harmful frictional forces set up as a result of such motion. Force from thrust plate 74 is transferred to plate 76 of guide member 78.

Guide member 78 is provided with the depending circular guide or skirt 92 adapted to be slidably guided by the cylindrical guide surface 94 provided on the body portion 20. Skirt 92 is provided with one or more passages 96 permitting communication between lower diaphragm chamber 38 and cylindrical body portion 18, and guide member 78 is provided with the centrally disposed threaded boss 98, which is adapted to be threadedly secured as at 100 to the upper end of stem extension 102, a lock nut 104 being preferably provided for preventing accidental dissociation between stem extension and boss 98.

Stem extension 102, as shown in Figures 2 and 4, is of substantially hexagonal shape in section, and extends through a circular bore 106 of adjusting screw 108, fitting closely within but freely movable in said passage, whereby the stem is guided by the adjusting screw. Plate 76, within skirt 92, is provided with the spring seat 110 on which the upper end of spring 112 is adapted to seat, the lower end of said spring being seated on spring seat 114 provided on the adjustable lower spring seat member 116. Spring seat member 116 is threaded correspondingly to the threads on adjusting screw 108 whereby rotation of said adjusting screw moves said member 116 in the selected direction to adjust the compression of spring 112. Seat 116 is prevented from rotating by spaced axially extending ribs 118, cast or otherwise secured on the inner surface of the lower housing body 20, said ribs being adapted to be received in suitable guide notches or slots 120 provided on the outer edge of seat member 116.

The lower end of adjusting screw 108 is provided with the shouldered head portion 122 extending within the throat 28 adapted to be rotated by a suitable wrench, which, due to the disposition of the throat, can be rotated through a wide angle permitting easy and rapid adjustment. Inasmuch as thrust from the diaphragm and/or from the spring is imparted to the adjusting screw, an anti-friction thrust bearing 124 is provided within the body portion 20 supported on the lower wall 126 of said body portion. The thrust bearing 124 comprises the upper and lower races 127 and 128 between which the anti-friction members 130 are disposed. An upper plate 132 is supported on the upper race member, and a thrust ring 134 is provided above member 132 fitting within a suitable recess 136 provided in the adjusting screw whereby the thrust is transferred from the screw to the anti-friction members and through the anti-friction members to the bottom wall 126 of the body portion 20.

The upper end of stem 30 is threaded as at 138, being adapted to be secured to corresponding threads 140 provided in the lower end of stem extension 102. A securing nut 142 is adapted to prevent accidental dissociation of stem 30 from stem extension 102 and also serves to secure pointer 144 in place whereby said pointer moves with stem 30 to indicate the operation of the mechanism operated by the motor. The stem position indicator comprises cover member 146 secured as at 148 to bracket 18, being slotted as at 150 for permitting vertical movement of the pointer 144 and being preferably graduated adjacent said slot.

Other indicia may be indicated adjacent the slot, such as in the case where the motor is associated with a valve which is normally open when the motor is inoperative and closed when the motor is operated, such as words Open and Close noted adjacent the top and bottom of the slot, as illustrated in Figure 3.

Pointer 144 will travel between two extreme positions determined by the travel of the stem 30 and two adjustable, normally stationary indicator members 152 and 154 which are slidably disposed in the slot, being adapted to be positioned by pointer 144 to indicate the extremities of travel of stem extension 102.

In operation of this form of the device, assuming that it is in the inoperative position as illustrated in Figures 1 and 2, the stem adjusting member 108 may be rotated through head 122 to adjust the spring 112 the desired amount. Fluid pressure introduced through opening 62 will act on the upper surface of diaphragm 66 and diaphragm 66 being a flexible member, tends to flex outwardly, thus imparting force and motion, after the spring 112 is overcome, to the stem extension 102 through the thrust plate 74 and guide member 78, the motion then being imparted through stem 30 to the mechanism operated, which by way of example, may be a valve poppet of a valve or damper blades of a damper.

The deep fold of the diaphragm, as above pointed out, enables the flat area of the diaphragm to travel an appreciable distance without stretching the flexible material, and the fold serves to maintain a constant effective area of the diaphragm throughout the entire travel of stem extension 102, thus providing the predetermined travel (as above set forth) for a definite increase in fluid pressure at all positions of travel of the stem extension 102, and consequently stem 30. The force from diaphragm 66 is imparted to the thrust plate 74 which is free to slide a limited distance laterally with respect to guide member 78, and thus the diaphragm is free to travel with no restraining influence laterally, whereby any sidewise thrust of the diaphragm is dissipated in free movement so that no harmful frictional forces are set up as a result of this motion. The diaphragm ring furnishes a means for self-sealing under increasing pressure, and as there are no perforations in the diaphragm, it is not subject to damage, and, therefore, can be used and reused. The stem 30 and stem guide 102 are kept in proper alignment by means of the guide 92—94 and the position of these members and consequently the condition of the operating means is readily observed through the position indicator.

It is to be understood that this application is not to be limited by the exact embodiments of the device shown, which are merely by way of illustration and not limitation as various and other forms of the device will, of course, be apparent to those skilled in the art without departing from the spirit of the invention or the scope of the claims.

We claim:

1. In a diaphragm motor of the fluid actuated type, the combination of a lower housing member comprising a cylindrical body portion having a lower closure wall, and a radial wall adjacent the upper end thereof, said radial wall having an outer portion extending upwardly to form a lower diaphragm chamber, said upwardly extending wall having an outwardly extending peripheral flange provided with a continuous groove, an upper housing member having an outer portion extending downwardly to form an upper diaphragm chamber, said last named outer portion terminating in an outwardly extending peripheral flange adapted to engage and be supported on said first named peripheral flange, securing means for fastening said flanges together, said last named flange having a continuous groove so disposed as to form a single channel with said first named groove, a flexible diaphragm having a peripheral bead adapted to be received in said channel and compressed therein to secure said diaphragm in a position to separate said lower and upper diaphragm chambers, a cylindrical guide surface on said body portion adjacent said radial wall, a piston member disposed in said lower diaphragm chamber and having a guide skirt slidably engaging said guide surface to be guided thereby, an adjusting screw in said body portion and extending through said lower closure wall, said adjusting screw having a cylindrical bore therethrough and having a head disposed outside said closure wall for rotating said screw, anti-friction means supported on said closure wall and supporting said screw, a spring seat threaded to said screw and having guiding means cooperating with guiding means on said body portion whereby rotation of said screw causes said spring seat to move along said screw, said piston member having a spring seat thereon, a spring disposed between said spring seats urging said piston member toward the upper housing member, a substantially hexagonal stem extension secured to said piston member and extending through said body portion and beyond said adjusting screw being slidably guided in said adjusting screw bore, a thrust plate supported on said piston member having a peripheral flange embracing the periphery of said piston member whereby said thrust plate may move a predetermined amount on said piston member, the membrane of the diaphragm between said bead being loosely supported on the thrust plate whereby it may move relatively thereto, said upper housing member having a central boss having a passage therethrough for permitting fluid flow to said upper diaphragm chamber, a depending annular ring on said upper housing member extending into said upper diaphragm chamber, said annular ring surrounding the boss passage and having a passage permitting fluid flow into the upper diaphragm chamber outwardly of said ring, said diaphragm in inoperative position being supported on said thrust plate and being urged by said spring to engage said ring, the diaphragm between said thrust plate and bead extending toward the lower diaphragm chamber a distance below the plane of the bead, said diaphragm below the bead being substantially arcuately folded to extend upwardly and outwardly to said bead, said body portion having a depending open bracket extending downwardly and provided with a securing bracket, and indicator mechanism for showing the position of the piston member, said indicator mechanism comprising a cover member secured to said open bracket and extending around said stem extension, said cover member having a slot parallel to said stem extension, a stem connected to said stem extension, a pointer secured between said stem and stem extension to move therewith and extending through said slot outwardly of said cover, and indicator members adjustable along said slot above and between said pointer to indicate the range thereof.

2. In a diaphragm motor of the fluid actuated type, the combination of a lower housing member comprising a cylindrical body portion having a lower closure wall, and a radial wall adjacent the upper end thereof, said radial wall having an outer portion extending upwardly to form a lower diaphragm chamber, said upwardly extending wall having an outwardly extending peripheral flange provided with a continuous groove, an upper housing member having an outer portion extending downwardly to form an upper diaphragm chamber, said last named outer portion terminating in an outwardly extending peripheral flange adapted to engage and be supported on said first named peripheral flange, securing means for fastening said flanges together, said last named flange having a continuous groove so disposed as to form a single channel with said first named groove, a flexible diaphragm having a peripheral bead adapted to be received in said channel and compressed therein to secure said diaphragm in a position to separate said lower and upper diaphragm chambers, a cylindrical guide surface on said body portion adjacent said radial wall, a piston member disposed in said lower diaphragm chamber and having a guide skirt slidably engaging said guide surface to be guided thereby, an adjusting screw in said body portion and extending through said lower closure wall, said adjusting screw having a cylindrical bore therethrough and having a head disposed outside said closure wall for rotating said screw, anti-friction means supported on said closure wall and supporting said screw, a spring seat threaded to said screw and having guiding means cooperating with guiding means on said body portion whereby rotation of said screw causes said spring seat to move along said screw, said piston member having a spring seat thereon, a spring disposed between said spring seats urging said piston member toward the upper housing member, a substantially hexagonal stem extension secured to said piston member and extending through said body portion and beyond said adjusting screw being slidably guided in said adjusting screw bore, and a thrust plate supported on said piston member having a peripheral flange embracing the periphery of said piston member whereby said thrust plate may move a predetermined amount on said piston member, the membrane of the diaphragm between said bead being loosely supported on the thrust plate whereby it may move relatively thereto, said upper housing member having a central boss having a passage therethrough for permitting fluid flow to said upper diaphragm chamber, a depending annular ring on said upper housing member extending into said upper diaphragm chamber, said annular ring surrounding the boss passage and having a passage permitting fluid flow into the upper diaphragm chamber outwardly of said ring, said diaphragm in inoperative position being supported on said thrust plate and being urged by said spring to engage said ring, the diaphragm between said thrust plate and bead extending toward the lower diaphragm chamber a distance below the plane of the bead, said diaphragm below the bead being substantially arcuately folded to extend upwardly and outwardly to said bead.

3. In a diaphragm motor of the fluid actuated type, the combination of a lower housing member comprising a cylindrical body portion having a lower closure wall, and a radial wall adjacent the upper end thereof, said radial wall having an outer portion extending upwardly to form a lower diaphragm chamber, said upwardly extending wall having an outwardly extending peripheral flange provided with a continuous groove, an upper housing member having an outer portion extending downwardly to form an upper diaphragm chamber, said last named outer portion terminating in an outwardly extending peripheral flange adapted to engage and be supported on said first named peripheral flange, securing means for fastening said flanges together, said last named flange having a continuous groove so disposed as to form a single channel with said first named groove, a flexible diaphragm having a peripheral bead adapted to be received in said channel and compressed therein to secure said diaphragm in a position to separate said lower and upper diaphragm chambers, a cylindrical guide surface on said body portion adjacent said radial wall, a piston member disposed in said lower diaphragm chamber and having a guide skirt slidably engaging said guide surface to be guided thereby, an adjusting screw in said body portion and extending through said lower closure wall, anti-friction means supported on said closure wall and supporting said screw, a spring seat threaded to said screw and having guiding means cooperating with guiding means on said body portion whereby rotation of said screw causes said spring seat to move along said screw, said piston member having a spring seat thereon, a spring disposed between said spring seats urging said piston member toward the upper housing member, a stem extension secured to said piston member and extending through said body portion and beyond said adjusting screw being slidably guided thereby, and a thrust plate supported on said piston member having a peripheral flange embracing the periphery of said piston member whereby said thrust plate may move a predetermined amount on said piston member, the membrane of the diaphragm between said bead being loosely supported on the thrust plate whereby it may move relatively thereto, said upper housing member having a central boss having a passage therethrough for permitting fluid flow to said upper diaphragm chamber, a depending annular ring on said upper housing member extending into said upper diaphragm chamber, said annular ring surrounding the boss passage and having a passage permitting fluid flow into the upper diaphragm chamber outwardly of said ring, said diaphragm in inoperative position being supported on said thrust plate and being urged by said spring to engage said ring, the diaphragm between said thrust plate and bead extending toward the lower diaphragm chamber a distance below the plane of the bead, said diaphragm below the bead being substantially arcuately folded to extend upwardly and outwardly to said bead.

4. In a diaphragm motor of the fluid actuated type, the combination of a lower housing member comprising a cylindrical body portion having a lower closure wall, and a radial wall adjacent the upper end thereof, said radial wall having an outer portion extending upwardly to form a lower diaphragm chamber, said upwardly extending wall having an outwardly extending peripheral flange provided with a continuous groove, an upper housing member having an outer portion extending downwardly to form an upper diaphragm chamber, said last named outer portion terminating in an outwardly extending peripheral flange adapted to engage and be supported on said first named peripheral flange, securing means for fastening said flanges together, said last named flange having a continuous groove so disposed as to form a single channel with said first named groove, a flexible diaphragm having a peripheral bead adapted to be received in said channel and compressed therein to secure said diaphragm in a position to separate said lower and upper diaphragm chambers, a cylindrical guide surface on said body portion adjacent said radial wall, a piston member disposed in said lower diaphragm chamber and having a guide skirt slidably engaging said guide surface to be guided thereby, said piston member having a stem extension extending through said lower wall, the membrane of the diaphragm between said bead being loosely supported by said piston member, means for introducing actuating fluid into said upper diaphragm chamber, said diaphragm in inoperative position having a central portion supported by said piston adjacent said upper housing member, the diaphragm between said central portion and bead extending toward the lower diaphragm chamber a distance below the plane of the bead, said diaphragm below the bead being substantially arcuately folded to extend upwardly and outwardly to said bead, and resilient means between said piston member and lower housing member urging said piston member toward the upper housing member.

5. In a diaphragm motor of the fluid actuated type, the combination of a lower housing member comprising a cylindrical body portion having a lower closure wall, and a radial wall adjacent the upper end thereof, said radial wall having an outer portion extending upwardly to form a lower diaphragm chamber, said upwardly extending wall having an outwardly extending peripheral flange provided with a continuous groove, an upper housing member having an outer portion extending downwardly to form an upper diaphragm chamber, said last named outer portion terminating in an outwardly extending peripheral flange adapted to engage and be supported on said first named peripheral flange, securing means for fastening said flanges together, said last named flange having a continuous groove so disposed as to form a single channel with said first named groove, a flexible diaphragm having a peripheral bead adapted to be received in said channel and compressed therein to secure said diaphragm in a position to separate said lower and upper diaphragm chambers, a piston member disposed in said lower diaphragm chamber, an adjusting screw in said body portion and extending through said lower closure wall, said adjusting screw having a cylindrical bore therethrough and having a head disposed outside said closure wall for rotating said screw, anti-friction means supported on said closure wall and supporting said screw, a spring seat threaded to said screw and having guiding means cooperating with guiding means on said body portion whereby rotation of said screw causes said spring seat to move along said screw, said piston member having a spring seat thereon, a spring disposed between said spring seats urging said piston member toward the upper housing member, a stem extension secured to said piston member and extending through and being guided by said adjusting screw, the membrane of the diaphragm between said bead being loosely supported by said piston member, means for introducing actuating fluid into said upper diaphragm chamber, said diaphragm in inoperative position having a central portion supported by said piston adjacent said upper housing member, the diaphragm between said central portion and bead extending toward the lower diaphragm chamber a distance below the plane of the bead, said diaphragm below the bead being substantially arcuately folded to extend upwardly and outwardly to said bead.

6. In a diaphragm motor of the fluid actuated type, the combination of a lower housing member comprising a cylindrical body portion having a lower closure wall, and a radial wall adjacent the upper end thereof, said radial wall having an outer portion extending upwardly to form a lower diaphragm chamber, said upwardly extending wall having an outwardly extending peripheral flange provided with a continuous groove, an upper housing member having an outer portion extending downwardly to form an upper diaphragm chamber, said last named outer portion terminating in an outwardly extending peripheral flange adapted to engage and be supported on said first named peripheral flange, securing means for fastening said flanges together, said last named flange having a continuous groove so disposed as to form a single channel with said first named groove, a flexible diaphragm having a peripheral bead adapted to be received in said channel and compressed therein to secure said diaphragm in a position to separate said lower and upper diaphragm chambers, a cylindrical guide surface on said body portion adjacent said radial wall, a piston member disposed in said lower diaphragm chamber and having a guide skirt slidably engaging said guide surface to be guided thereby, an adjusting screw in said body portion and extending through said lower closure wall, said adjusting screw having a cylindrical bore therethrough and having a head disposed outside said closure wall for rotating said screw, anti-friction means supported on said closure wall and supporting said screw, a spring seat threaded to said screw and having guiding means cooperating with guiding means on said body portion whereby rotation of said screw causes said spring seat to move along said screw, said piston member having a spring seat thereon, a spring disposed between said spring seats urging said piston member toward the upper housing member, a stem extension secured to said piston member and extending through and being guided by said adjusting screw, the membrane of the diaphragm between said bead being loosely supported by said piston member, means for introducing actuating fluid into said upper diaphragm chamber, said diaphragm in inoperative position having a central portion supported by said piston adjacent said upper housing member, the diaphragm between said central portion and bead extending toward the lower diaphragm chamber to a distance below the plane of the bead, said diaphragm below the bead being substantially arcuately folded to extend upwardly and outwardly to said bead.

7. In a diaphragm motor of the fluid actuated type, the combination of a lower housing member comprising a cylindrical body portion having a lower closure wall, and a radial wall adjacent the upper end thereof, said radial wall having an outer portion extending upwardly to form a lower diaphragm chamber, said upwardly extending wall having an outwardly extending peripheral flange provided with a continuous groove, an upper housing member having an outer portion extending downwardly to form an upper diaphragm chamber, said last named outer portion terminating in an outwardly extending peripheral flange adapted to engage and be supported on said first named peripheral flange, securing means for fastening said flanges together, said last named flange having a continuous groove so disposed as to form a single channel with said first named groove, a flexible diaphragm having a peripheral bead adapted to be received in said channel and compressed therein to secure said diaphragm in a position to separate said lower and upper diaphragm chambers, a piston member disposed in said lower diaphragm chamber having a stem extension extending through said lower wall, the membrane of the diaphragm between said bead being loosely supported by said piston member, means for introducing actuating fluid into said upper diaphragm chamber, said diaphragm in inoperative position having a central portion supported by said piston adjacent said upper housing member, the diaphragm between said central portion and bead extending toward the lower diaphragm chamber a distance below the plane of the bead, said diaphragm below the bead being substantially arcuately folded to extend upwardly and outwardly to said bead, and resilient means between said piston member and lower housing member urging said piston member toward the upper housing member, said body portion having a depending open bracket extending downwardly and provided with a securing bracket, and indicator mechanism for showing the position of the piston member, said indicator mechanism comprising a cover member secured to said open bracket and extending around said stem extension, said cover member having a slot parallel to said stem extension, a stem connected to said stem extension, a pointer secured between said stem and stem extension to move therewith and extending through said slot outwardly of said cover, and indicator members adjustable along said slot above and between said pointer to indicate the range thereof.

8. In a diaphragm motor of the fluid actuated type, the combination of a lower housing member comprising a cylindrical body portion having a lower closure wall, and a radial wall adjacent the upper end thereof, said radial wall having an outer portion extending upwardly to form a lower diaphragm chamber, said upwardly extending wall having an outwardly extending peripheral flange provided with a continuous groove, an upper housing member having an outer portion extending downwardly to form an upper diaphragm chamber, said last named outer portion terminating in an outwardly extending peripheral flange adapted to engage and be supported on said first named peripheral flange, securing means for fastening said flanges together, said last named flange having a continuous groove so disposed as to form a single channel with said first named groove, a flexible diaphragm having a peripheral bead adapted to be received in said channel and compressed therein to secure said diaphragm in a position to separate said lower and upper diaphragm chambers, a cylindrical guide surface on said body portion adjacent said radial wall, a piston member disposed in said lower diaphragm chamber and having a guide skirt slidably engaging said guide surface to be guided thereby, said piston member having a stem extension extending through said lower wall, the membrane of the diaphragm between said bead being loosely supported by said piston member, means for introducing actuating fluid into said upper diaphragm chamber, said diaphragm in inoperative position having a central portion supported by said piston adjacent said upper housing member, the diaphragm between said central portion and bead extending toward the lower diaphragm chamber a distance below the plane of the bead, said diaphragm below the bead being substantially arcuately folded to extend upwardly and outwardly to said bead, and resilient means between said piston member and lower housing member urging said piston member toward the upper housing member, said body portion having a depending open bracket extending downwardly and provided with a securing bracket, and indicator mechanism for showing the position of the piston member, said indicator mechanism comprising a cover member secured to said open bracket and extending around said stem extension, said cover member having a slot parallel to said stem extension, a stem connected to said stem extension, a pointer secured between said stem and stem extension to move therewith and extending through said slot outwardly of said cover, and indicator members adjustable along said slot above and between said pointer to indicate the range thereof.

9. In a diaphragm motor of the fluid actuated type, the combination of a lower housing member comprising a cylindrical body portion having a lower closure wall, and a radial wall adjacent the upper end thereof, said radial wall having an outer portion extending upwardly to form a lower diaphragm chamber, said upwardly extending wall having an outwardly extending peripheral flange provided with a continuous groove, an upper housing member having an outer portion extending downwardly to form an upper diaphragm chamber, said last named outer portion terminating in an outwardly extending peripheral flange adapted to engage and be supported on said first named peripheral flange, securing means for fastening said flanges together, said last named flange having a continuous groove so disposed as to form a single channel with said first named groove, a flexible diaphragm having a peripheral bead adapted to be received in said channel and compressed therein to secure said diaphragm in a position to separate said lower and upper diaphragm chambers, a piston member disposed in said lower diaphragm chamber, an adjusting screw in said body portion and extending through said lower closure wall, said adjusting screw having a cylindrical bore therethrough and having a head disposed outside said closure wall for rotating said screw, anti-friction means supported on said closure wall and supporting said screw, a spring seat threaded to said screw and having guiding means cooperating with guiding means on said body portion whereby rotation of said screw causes said spring seat to move along said screw, said piston member having a spring seat thereon, a spring disposed between said spring seats urging said piston member toward the upper housing member, a stem extension secured to said piston member and extending through and being guided by said adjusting screw, the membrane of the diaphragm between said bead being loosely supported by said piston member, means for introducing actuating fluid into said upper diaphragm chamber, said diaphragm in inoperative position having a central portion supported by said piston adjacent said upper housing member, the diaphragm between said central portion and bead extending toward the lower diaphragm chamber a distance below the plane of the bead, said diaphragm below the bead being substantially arcuately folded to extend upwardly and outwardly to said bead, said body portion having a depending open bracket extending downwardly and provided with a securing bracket, and indicator mechanism for showing the position of the piston member, said indicator mechanism comprising a cover member secured to said open bracket and extending around said stem extension, said cover member having a slot parallel to said stem extension, a stem connected to said stem extension, a pointer secured between said stem and stem extension to move therewith and extending through said slot outwardly of said cover, and indicator members adjustable along said slot above and between said pointer to indicate the range thereof.

10. In a diaphragm motor of the fluid actuated type, the combination of a lower housing member comprising a cylindrical body portion having a lower closure wall, and a radial wall adjacent the upper end thereof, said radial wall having an outer portion extending upwardly to form a lower diaphragm chamber, said upwardly extending wall having an outwardly extending peripheral flange provided with a continuous groove, an upper housing member having an outer portion extending downwardly to form an upper diaphragm chamber, said last named outer portion terminating in an outwardly extending peripheral flange adapted to engage and be supported on said first named peripheral flange, securing means for fastening said flanges together, said last named flange having a continuous groove so disposed as to form a single channel with said first named groove, a flexible diaphragm having a peripheral bead adapted to be received in said channel and compressed therein to secure said diaphragm in a position to separate said lower and upper diaphragm chambers, a piston member disposed in said lower diaphragm chamber, an adjusting screw in said body portion and extending through said lower closure wall, said adjusting screw having a cylindrical bore therethrough and having a head disposed outside said closure wall for rotating said screw, bearing means supported on said closure wall and supporting said screw, a spring seat slidably but nonrotatably mounted in said body portion and movable upon rotation of said adjusting screw, said piston member having a spring seat thereon, a spring disposed between said spring seats, urging said piston member toward the upper housing member, a stem extension secured to said piston member and extending through and being guided by said adjusting screw, the membrane of the diaphragm between said bead being loosely supported by said piston member, means for introducing actuating fluid into said upper diaphragm chamber, said diaphragm in inoperative position having a central portion supported by said piston adjacent said upper housing member, the diaphragm between said central portion and bead extending toward the lower diaphragm chamber a distance below the plane of the bead, said diaphragm below the bead being substantially arcuately folded to extend upwardly and outwardly to said bead.

11. In a diaphragm motor of the fluid actuated type, the combination of a lower housing member comprising a cylindrical body portion having a lower closure wall, and a radial wall adjacent the upper end thereof, said radial wall having an outer portion extending upwardly to form a lower diaphragm chamber, said upwardly extending wall having an outwardly extending peripheral flange provided with a continuous groove, an upper housing member having an outer portion extending downwardly to form an upper diaphragm chamber, said last named outer portion terminating in an outwardly extending peripheral flange adapted to engage and be supported on said first named peripheral flange, securing means for fastening said flanges together, said last named flange having a continuous groove so disposed as to form a single channel with said first named groove, a flexible diaphragm having a peripheral bead adapted to be received in said channel and compressed therein to secure said diaphragm in a position to separate said lower and upper diaphragm chambers, a piston member disposed in said lower diaphragm chamber, an adjusting screw in said body portion and extending through said lower closure wall, said adjusting screw having a cylindrical bore therethrough and having a bead disposed outside said closure wall for rotating said screw, bearing means supported on said closure wall and supporting said screw, a spring seat slidably but non-rotatably mounted in said body portion and movable upon rotation of said adjusting screw, said piston member having a spring seat thereon, a spring disposed between said spring seats urging said piston member toward the upper housing member, a stem extension secured to said piston member and extending through and being guided by said adjusting screw, the membrane of the diaphragm between said bead being loosely supported by said piston member, means for introducing actuating fluid into said upper diaphragm chamber, said diaphragm in inoperative position having a central portion supported by said piston adjacent said upper housing member, the diaphragm between said central portion and bead extending toward the lower diaphragm chamber a distance below the plane of the bead, said diaphragm below the bead being substantially arcuately folded to extend upwardly and outwardly to said bead, said body portion having a depending open bracket extending downwardly and provided with a securing bracket, and indicator mechanism for showing the position of the piston member, said indicator mechanism comprising a cover member secured to said open bracket and extending around said stem extension, said cover member having a slot parallel to said stem extension, a stem connected to said stem extension, a pointer secured between said stem and stem extension to move therewith and extending through said slot outwardly of said cover, and indicator members adjustable along said slot above and between said pointer to indicate the range thereof.

12. In a diaphragm motor of the fluid actuated type, the combination of a lower housing member comprising a cylindrical body portion having a lower closure wall, and a radial wall adjacent the upper end thereof, said radial wall having an outer portion extending upwardly to form a lower diaphragm chamber, said upwardly extending wall having an outwardly extending peripheral flange provided with a continuous groove, an upper housing member having an outer portion extending downwardly to form an upper diaphragm chamber, said last named outer portion terminating in an outwardly extending peripheral flange adapted to engage and be supported on said first named peripheral flange, securing means for fastening said flanges together, said last named flange having a continuous groove so disposed as to form a single channel with said first named groove, a flexible diaphragm having a peripheral bead adapted to be received in said channel and compressed therein to secure said diaphragm in a position to separate said lower and upper diaphragm chambers, and means in one of said diaphragm chambers adapted to be actuated by said diaphragm, the junction between the first named outer portion of said radial wall and the first named flange forming a rounded edge between lower diaphragm chamber and the first named groove, and the junction between the second named outer portion and the second named peripheral flange forming a rounded edge between the upper diaphragm chamber and the second named groove, said rounded flanges being spaced apart a distance at least as thick as the thickness of the diaphragm passing between said edges when the peripheral flanges are in contact with each other.

13. In a diaphragm motor of the fluid actuated type, the combination of a lower housing member comprising a cylindrical body portion having a lower closure wall, and a radial wall adjacent the upper end thereof, said radial wall having an outer portion extending upwardly to form a lower diaphragm chamber, said upwardly extending wall having an outwardly extending peripheral flange provided with a continuous groove, an upper housing member having an outer portion extending downwardly to form an upper diaphragm chamber, said last named outer portion terminating in an outwardly extending peripheral flange adapted to engage and be supported on said first named peripheral flange, securing means for fastening said flanges together, said last named flange having a continuous groove so disposed as to form a single channel with said first named groove, a flexible diaphragm having a peripheral bead adapted to be received in said channel and compressed therein to secure said diaphragm in a position to separate said lower and upper diaphragm chambers, and means in one of said diaphragm chambers adapted to be actuated by said diaphragm, the junction between the first named outer portion of said radial wall and the first named flange forming a rounded edge between lower diaphragm chamber and the first named groove, and the junction between the second named outer portion and the second named peripheral flange forming a rounded edge between the upper diaphragm chamber and the second named groove, said rounded flanges being spaced apart a distance at least as thick as the thickness of the diaphragm passing between said edges when the peripheral flanges are in contact with each other, the diameters of the grooves being equal to each other but greater than the diameter of the bead.

14. In a diaphragm motor of the fluid actuated type, the combination of a lower housing member comprising a cylindrical body portion having a lower closure wall, and a radial wall adjacent the upper end thereof, said radial wall having an outer portion extending upwardly to form a lower diaphragm chamber, said upwardly extending wall having an outwardly extending peripheral flange provided with a continuous groove, an upper housing member having an outer portion extending downwardly to form an upper diaphragm chamber, said last named outer portion terminating in an outwardly extending peripheral flange adapted to engage and be supported on said first named peripheral flange, securing means for fastening said flanges together, said last named flange having a continuous groove so disposed as to form a single channel with said first named groove, a flexible diaphragm having a peripheral bead adapted to be received in said channel and compressed therein to secure said diaphragm in a position to separate said lower and upper diaphragm chambers, and means in one of said diaphragm chambers adapted to be actuated by said diaphragm, the junction between the first named outer portion of said radial wall and the first named flange forming a rounded edge between lower diaphragm chamber and the first named groove, and the junction between the second named outer portion and the second named peripheral flange forming a rounded edge between the upper diaphragm chamber and the second named groove, said rounded flanges being spaced apart a distance at least as thick as the thickness of the diaphragm passing between said edges when the peripheral flanges are in contact with each other, the diameters of the grooves being equal to each other but greater than the diameter of the bead, the grooves in the peripheral flanges being disposed so that the bead is compressed in said channel when the flanges are in contact with each other.

15. In a diaphragm motor of the fluid actuated type, the combination of a lower housing member comprising a cylindrical body portion having a lower closure wall, and a radial wall adjacent the upper end thereof, said radial wall having an outer portion extending upwardly to form a lower diaphragm chamber, said upwardly extending wall having an outwardly extending peripheral flange provided with a continuous groove, an upper housing member having an outer portion extending downwardly to form an upper diaphragm chamber, said last named outer portion terminating in an outwardly extending peripheral flange adapted to engage and be supported on said first named peripheral flange, securing means for fastening said flanges together, said last named flange having a continuous groove so disposed as to form a single channel with said first named groove, a flexible diaphragm having a peripheral bead adapted to be received in said channel and compressed therein to secure said diaphragm in a position to separate said lower and upper diaphragm chambers, and means in one of said diaphragm chambers adapted to be actuated by said diaphragm, the diameters of the grooves being equal to each other but greater than the diameter of the bead, the grooves in the peripheral flanges being disposed so that the bead is compressed in said channel when the flanges are in contact with each other.

DAVID H. THORBURN.
JOSEPH E. PANZA.

REFERENCES CITED

The following references are of record in the file of this patent:

UNITED STATES PATENTS

| Number | Name | Date |
| --- | --- | --- |
| 356,997 | Gil | Feb. 1, 1887 |
| 2,300,722 | Adams | Nov. 3, 1942 |
| 2,343,320 | Parker | Mar. 7, 1944 |
| 2,345,475 | Herman | Mar. 28, 1944 |
| 2,371,632 | Lippincott | Mar. 20, 1945 |
| 2,417,494 | Hoof | Mar. 18, 1947 |
| 2,437,552 | Quiroz | Mar. 9, 1948 |